United States Patent [19]
Griffith et al.

[11] 3,956,246
[45] May 11, 1976

[54] MANUFACTURE OF IMPACT-RESISTANT OLEFINIC-NITRILE COPOLYMERS

[75] Inventors: Russell K. Griffith, Chagrin Falls; John F. Jones, Cuyahoga Falls, both of Ohio

[73] Assignee: Standard Oil Company, Cleveland, Ohio

[22] Filed: May 4, 1972

[21] Appl. No.: 250,125

[52] U.S. Cl. .......................... 526/338; 260/880 R; 260/880 B; 526/342; 526/347
[51] Int. Cl.² ........................ C08F 2/18; C08F 2/22
[58] Field of Search ............ 260/880 B, 880 R, 80.7

[56] References Cited
UNITED STATES PATENTS

| | | | |
|---|---|---|---|
| 3,168,593 | 2/1965 | Fremon et al. | 260/880 |
| 3,442,981 | 5/1969 | Stafford et al. | 260/880 |
| 3,538,194 | 11/1970 | Barrett et al. | 260/879 |
| 3,615,710 | 10/1971 | Lee et al. | 99/171 LP |
| 3,676,527 | 7/1972 | Babcock et al. | 260/876 R |
| 3,742,092 | 6/1973 | Duke et al. | 260/880 R |

*Primary Examiner*—Stanford M. Levin
*Attorney, Agent, or Firm*—John F. Jones; Sherman J. Kemmer

[57] ABSTRACT

Impact-resistant polymers, which have low permeability to gases and vapors, are prepared by polymerizing methacrylonitrile with styrene to at least about 70% conversion and then introducing into the polymerization reaction medium a conjugated diene monomer, such as butadiene-1,3 and optionally styrene or methacrylonitrile, and completing the polymerization reaction.

7 Claims, No Drawings

MANUFACTURE OF IMPACT-RESISTANT OLEFINIC-NITRILE COPOLYMERS

The present invention relates to the manufacture of polymeric resins which have low permeability to gases, and more particularly pertains to novel impact-resistant, thermoplastic polymeric resins which function as gas and vapor barrier materials which are composed of a conjugated diene monomer, methacrylonitrile, and styrene, and particularly pertains to a novel process for the preparation of these polymeric materials.

The prior art processes for the manufacture of impact-resistant, rubber-modified resins usually require at least two steps, i.e., rubber preparation and graft polymerization of the resin monomers in the presence of the preformed rubber.

The products of the novel process of the present invention, which appear to have all of the desired properties usually found in rubber-modified resins such as impact resistance, clarity, and processability, can be prepared in a single reactor from simple monomeric materials and do not require the inclusion of a preformed rubber of any type. The products of the present invention are prepared by polymerizing a major portion of methacrylonitrile and a minor portion of styrene to a conversion of at least about 70% by weight of monomers to polymer, and then the polymerization is continued in the presence of a conjugated diene monomer, such as butadiene-1,3 and optionally one or more monovinyl monomers copolymerizable therewith, preferably styrene or methacrylonitrile and mixtures thereof.

The conjugated diene monomers useful in the present invention include butadiene-1,3, isoprene, chloroprene, bromoprene, cyanoprene, 2,3-dimethyl-butadiene-1,3, and the like. Most preferred for the purpose of this invention are butadiene-1,3 and isoprene because of their ready availability and their excellent copolymerization properties.

Although methacrylonitrile and styrene are particularly preferred as monomers in the present invention, other vinyl aromatic monomers of the benzene series having the vinyl radical directly attached to a carbon atom of the aromatic nucleus, including the alkaryl and haloaryl monomers, can be used wholly or in part in place of styrene. Among suitable monovinyl aromatic compounds are styrene, vinyl toluene, vinyl xylene, isopropylstyrene, t-butylstyrene, chlorostyrene, dichlorostyrene, bromostyrene, fluorostyrene, chlorovinyl toluene, and the like, and mixtures thereof.

The polymeric compositions of the present invention can be prepared by any of the known general techniques of emulsion or suspension polymerization by batch, continuous or intermittent addition of the monomers and other components so long as the conjugated diene monomer component is not added until at least 70% by weight of the other monomer components are converted to polymer. The preferred method is aqueous emulsion or suspension polymerization. The polymerization is preferably carried out in an aqueous medium in the presence of an emulsifying agent and a free-radical generating polymerization initiator at a temperature of from about 0° to 100°C in the substantial absence of molecular oxygen. The simultaneous interpolymerization of a mixture of the conjugated diene monomer, the methacrylonitrile, and styrene does not produce polymeric products which resemble the novel polymeric products which result from the instant process.

The preferred polymeric compositions embodied herein are those resulting from the polymerization to at least 70% by weight conversion of 100 parts by weight of (A) from about 70% to 95% by weight of methacrylonitrile and (B) from about 5% to 30% by weight based on the combined weights of (A) and (B) of styrene, and then including in the polymerization medium from 1 to 40 parts by weight per 100 parts by weight of (A) plus (B) of (C) from about 70% to 100% by weight of at least one conjugated diene monomer selected from the group consisting of butadiene-1,3 and isoprene and (D) from about 0% to 30% by weight based on the combined weights of (C) plus (D) of at least one member selected from the group consisting of styrene and methacrylonitrile, and continuing the polymerization to a final conversion of from about 80% to 100% by weight of monomers to polymer.

More specifically, the present invention can be illustrated by the polymerization of a mixture of methacrylonitrile and styrene to a conversion of at least 80% by weight of monomers to polymer, and then including butadiene-1,3 in the polymerization mixture and completing the polymerization reaction to produce a polymer having excellent impact strength and exceptionally good impermeability to gases and vapors when exposed to said gases and vapors in the form of a film or thin sheet. Preferably, the methacrylonitrile-styrene monomer feed should contain at least 70% by weight of methacrylonitrile based on the combined weights of methacrylonitrile and styrene.

In the foregoing illustrative polymerization, it is preferred that from about 1 to 40, and preferably 1 to 20, parts by weight of the combined conjugated diene monomer styrene-methacrylonitrile component (C) plus (D) be employed in the polymerization according to the process of this invention for each 100 parts by weight of combined methacrylonitrile and styrene (A) plus (B) monomer component. It has been found that as the relative amount of the diene monomer component is increased in the final polymeric product, the impact strength increases and the gas and vapor barrier properties decrease somewhat. It is generally preferred to use just enough of the conjugated diene monomer component to impart the desired impact strength to the polymeric product and, at the same time, to retain the optimum gas and vapor barrier properties of the polymeric product.

The polymeric products of the process of the present invention are readily processible, impact-resistant (i.e., having notched Izod impact strengths of at least 0.5 foot pounds per inch of notch), thermoplastic materials which can be thermoformed into a wide variety of useful articles in any of the conventional ways employed with known thermoplastic polymeric materials, such as by extrusion, milling, molding, drawing, blowing, etc. The polymeric products of this invention have excellent solvent resistance, and their impact strength and low permeability to gases and vapors make them very useful in the packaging industry and make them very useful materials from which to manufacture bottles, film, and other types of containers for liquids and solvents. The low permeability of the novel resins produced by the process of this invention to gases such as oxygen and carbon dioxide makes them particularly useful materials for the fabrication of bottles for carbonated beverages and vegetable oils.

In the following illustrative examples, the amounts of ingredients are expressed in parts by weight unless otherwise specified.

EXAMPLE 1

A polymer was prepared in aqueous emulsion using the following ingredients:

| Ingredient | Parts |
| --- | --- |
| water | 250 |
| sodium lauryl sulfate | 1.0 |
| methacrylonitrile | 90 |
| styrene | 10 |
| limonene dimercaptan | 0.5 |
| $(NH_4)_2S_2O_8$ | 0.05 |

The polmerization was carried out at 70°C with stirring in the substantial absence of air for 31.16 hours to a conversion of 87.3% of monomers to polymer, at which point 13.7 parts of butadiene-1,3 and 0.05 parts of $(NH_4)_2S_2O_8$ were added to the polymerization mixture and the polymerization reaction was continued for an additional 64 hours. The resin was isolated from the latex by precipitation in methanol, was washed, and dried, and was found to contain 8.8% of butadiene-1,3 in it by infrared analysis. This resin was found to have the following physical properties:

| | |
| --- | --- |
| Brabender plasticorder torque | 1600 meter grams (230°C and 35 rpm to constant torque) |
| optical properties | translucent |
| notched Izod impact strength | 1.0 foot pound per inch of notch |
| ASTM heat distortion temperature | 89°C |
| flexural strength ($\times 10^3$ psi) | 12.5 |
| flexural modulus ($\times 10^5$ psi) | 4.2 |
| tensile strength ($\times 10^3$ psi) | 7.8 |

EXAMPLE 2

A polymer was prepared in aqueous emulsion using the following ingredients:

| Ingredient | Parts |
| --- | --- |
| water | 250 |
| sodium lauryl sulfate | 1.0 |
| methacrylonitrile | 90 |
| styrene | 10 |
| limonene dimercaptan | 0.3 |
| $(NH_4)_2S_2O_8$ | 0.05 |

The polymerization was carried out in the substantial absence of molecular oxygen with constant agitation at 70°C for 23.8 hours to a conversion of 84.3% monomers to polymer, at which point there were added to the polymerization mixture 11.8 parts of butadiene-1,3, 3.33 parts of styrene, and 0.05 parts of $(NH_4)_2S_2O_8$ and the polymerization was allowed to continue at 70°C with stirring for an additional 6 hours. A final conversion of 85% by weight of all monomers to polymer was obtained. The resin was isolated from the latex and was found to have the following physical properties:

| | |
| --- | --- |
| Brabender plasticorder torque | 2640 meter grams |
| optical properties | clear (transparent) |
| notched Izod impact strength | 0.64 foot pound per inch of notch |
| ASTM heat distortion temperature | 91°C |
| flexural strength ($\times 10^3$ psi) | 12.0 |
| flexural modulus ($\times 10^5$ psi) | 3.6 |
| tensile strength ($\times 10^3$ psi) | 8.5 |
| oxygen transmission (cc/mil/100 square inches/ 24 hours/atmosphere) | 0.8 |
| water vapor transmission (grams/mil/100 square inches/ 24 hours) | 3.9 |

EXAMPLE 3

A polymer, which is outside the scope of the present invention, was prepared from the following ingredients:

| Ingredient | Parts |
| --- | --- |
| water | 250 |
| sodium lauryl sulfate | 1.0 |
| methacrylonitrile | 90 |
| styrene | 10 |
| butadiene-1,3 | 11.33 |
| limonene dimercaptan | 0.3 |
| $(NH_4)_2S_2O_8$ | 0.05 |

The polymerization was carried out in the substantial absence of molecular oxygen at 70°C with stirring for 66.3 hours. A conversion of 39% was obtained in this case. The polymeric resin was isolated and was found to have the following properties:

| | |
| --- | --- |
| Brabender plasticorder torque | 150 meter grams |
| notched Izod impact strength | 0.13 foot pound per inch of notch |
| ASTM heat distortion temperature | 49.5°C |
| flexural strength ($\times 10^3$ psi) | 5.71 |
| flexural modulus ($\times 10^5$ psi) | 4.1 |

EXAMPLE 4

A polymer was prepared at 60°C, in accordance with the procedures of the preceding examples, from the following mixture:

| Ingredient | Parts |
| --- | --- |
| water | 250 |
| sodium lauryl sulfate | 1.0 |
| methacrylonitrile | 90 |
| styrene | 10 |
| limonene dimercaptan | 0.3 |
| $(NH_4)_2S_2O_8$ | 0.05 |

The polymerization was carried to 95.1% conversion at which point 14 parts of butadiene-1,3, 3.9 parts of methacrylonitrile, and 3.9 parts of a 0.1 molar aqueous solution of ammonium persulfate were added and the polymerization was continued for 946 minutes at 70°C. The latex which resulted was coagulated and the resin was isolated and dried. The resin was found to have the following properties:

| | |
| --- | --- |
| Brabender plasticorder torque | 2900 meter grams |
| optical properties | clear |
| notched Izod impact strength | 1.0 foot pound per inch of notch |
| ASTM heat distortion temperature | 97.5°C |
| flexural strength ($\times 10^3$ psi) | 12.9 |
| flexural modulus ($\times 10^5$ psi) | 3.82 |
| % butadiene-1,3 in resin | 9.1 |

EXAMPLE 5

The procedure of Example 4 was repeated except that at 95.1% conversion of the 90/10 methacrylonitrile/styrene copolymer, a mixture of 14.8 parts by weight of butadiene-1,3, 3.9 parts of 0.1 molar $(NH_4)_2S_2O_8$ solution, and 1.95 parts of styrene were added and the polymerization was allowed to continue for 1156 minutes longer at 70°C. A final yield of 97% of theory of resin was obtained. The resin was found to have the following properties:

| | |
|---|---|
| Brabender plasticorder torque | 2910 meter grams |
| optical properties | clear |
| notched Izod impact strength | 0.7 foot pound per inch of notch |
| ASTM heat distortion temperature | 99.5°C |
| flexural strength ($\times 10^3$ psi) | 12.8 |
| flexural modulus ($\times 10^5$ psi) | 3.94 |

We claim:

1. The process comprising polymerising in an aqueous medium in the substantial absence of oxygen at a temperature in the range of from about 0° to 100°C to at least 70% by weight conversion of 100 parts by weight of a monomer component comprising
   A. from about 70 to 95% by weight of methacrylonitrile and
   B. from about 5 to 30% by weight based on the combined weights of (A) plus (B) of styrene and then including in the polymerization from 1 to 40 parts by weight per 100 parts by weight of (A) plus (B) of
   C. from about 70 to 100% by weight of at least one conjugated diene monomer selected from the group consisting of butadiene-1,3 and isoprene and
   D. from about 0 to 30% by weight based on the combined weights of (C) plus (D) of at least one member selected from the group consisting of styrene and methacrylonitrile and continuing the polymerization to a final conversion of from about 80 to 100% by weight of monomers to polymer.

2. The process of claim 1 carried out in an aqueous emulsion.

3. The process of claim 2 wherein the polymerization of monomer component (A) plus (B) is carried out to at least 80% by weight conversion before monomer component (C) plus (D) is included.

4. The process of claim 3 wherein monomer component (D) is styrene.

5. The process of claim 3 wherein monomer component (D) is methacrylonitrile.

6. The process of claim 3 wherein monomer component (D) is styrene and methacrylonitrile.

7. The process of claim 1 wherein there is included in the polymerization from 1 to 20 parts by weight of (C) and (D).

* * * * *